United States Patent
Kitao

(10) Patent No.: US 11,888,165 B2
(45) Date of Patent: Jan. 30, 2024

(54) CATALYST LAYER

(71) Applicant: TOYOTA JIDOSHA KABUSHIKI KAISHA, Toyota (JP)

(72) Inventor: Noriyuki Kitao, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 17/543,843

(22) Filed: Dec. 7, 2021

(65) Prior Publication Data
US 2022/0190351 A1 Jun. 16, 2022

(30) Foreign Application Priority Data
Dec. 10, 2020 (JP) ................................ 2020-204943

(51) Int. Cl.
*H01M 4/86* (2006.01)
*H01M 4/90* (2006.01)
*H01M 4/88* (2006.01)

(52) U.S. Cl.
CPC ....... *H01M 4/8673* (2013.01); *H01M 4/8807* (2013.01); *H01M 4/9041* (2013.01)

(58) Field of Classification Search
CPC ............. H01M 4/8673; H01M 4/8807; H01M 4/9041; H01M 4/9083; Y02E 60/50
See application file for complete search history.

(56) References Cited

U.S. PATENT DOCUMENTS

| | | | | |
|---|---|---|---|---|
| 8,007,953 B2 * | 8/2011 | Tanuma | ............. | H01M 8/0239 |
| | | | | 429/479 |
| 2003/0091891 A1 * | 5/2003 | Yoshida | ............. | H01M 8/0243 |
| | | | | 429/534 |
| 2004/0197638 A1 | 10/2004 | McElrath et al. | | |
| 2006/0093893 A1 * | 5/2006 | Matsuo | ................ | H01M 4/926 |
| | | | | 429/492 |
| 2009/0208780 A1 | 8/2009 | Sun et al. | | |

FOREIGN PATENT DOCUMENTS

| | | |
|---|---|---|
| JP | 2006511927 A | 4/2006 |
| JP | 2007061698 A | 3/2007 |
| JP | 2008258057 A | 10/2008 |
| JP | 2015042614 A | 3/2015 |
| JP | 2019172476 A | 10/2019 |
| WO | 2017135386 A1 | 8/2017 |

* cited by examiner

*Primary Examiner* — Victoria H Lynch
(74) *Attorney, Agent, or Firm* — Dickinson Wright, PLLC

(57) ABSTRACT

To provide a catalyst layer that is low in gas diffusion resistance and proton resistance even when a support having a small specific surface area is used. The catalyst layer is a catalyst layer for fuel cells, wherein the catalyst layer comprises a catalyst metal, a support and a conductive additive; wherein the support supports the catalyst metal; wherein a specific surface area of the support is 600 $m^2$/g-C or less; wherein the conductive additive does not support the catalyst metal and has a larger aspect ratio than the support; wherein the aspect ratio of the conductive additive is more than 10; wherein, when a total mass of the catalyst layer is 100 mass %, a percent of the conductive additive contained in the catalyst layer is more than 2 mass % and less than 20 mass %; and wherein the conductive additive is a non-hydrophilized conductive additive.

2 Claims, No Drawings

CATALYST LAYER

TECHNICAL FIELD

The disclosure relates to a catalyst layer.

BACKGROUND

A fuel cell (FC) is a power generation device that generates electrical energy by electrochemical reaction between fuel gas (such as hydrogen) and oxidant gas (such as oxygen and air) in a single unit fuel cell or a fuel cell stack (hereinafter, it may be simply referred to as "stack") composed of stacked unit fuel cells (hereinafter may be referred to as "cells"). Hereinafter, fuel gas and oxidant gas may be simply referred to as "reaction gas" or "gas" without any particular distinction.

In general, the unit fuel cells include a membrane electrode assembly (MEA).

The membrane electrode assembly has a structure such that a catalyst layer and a gas diffusion layer are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, each unit fuel cell includes two separators sandwiching the membrane electrode gas diffusion layer assembly. In general, the separators have a structure such that a groove is formed as a reaction gas flow path on a surface in contact with the gas diffusion layer. The separators also function as a generated electricity collector.

In the fuel electrode (anode) of the fuel cell, hydrogen ($H_2$) is supplied as fuel gas from the gas flow path and the gas diffusing layer; the supplied hydrogen is protonated by catalytic action of the catalyst layer; and the protonated hydrogen goes to the oxidant electrode (cathode) through the electrolyte membrane. Electrons are generated at the same time, pass through an external circuit, do work, and then go to the cathode. Oxygen ($O_2$) is supplied as oxidant gas to the cathode, and the supplied oxygen reacts with protons and electrons on the cathode, thereby generating water. The generated water gives appropriate humidity to the electrolyte membrane, and excess water permeates through the gas diffusion layer and is discharged to the outside of the system.

There are considerable research on fuel cells configured to be installed and used in a fuel cell vehicle (hereinafter, it may be simply referred to as "vehicle").

For example, Patent Literature 1 discloses a catalytic layer for fuel cells, which is mixed with high-aspect-ratio conductive carbon fibers.

Patent Literature 2 discloses carbon-based fibers for fuel cells, comprising carbon nanofibers and carbon particles aggregated into the carbon nanofibers.

Patent Literature 3 discloses an electrode catalyst for fuel cells, in which a catalyst metal is deposited on a mixture of carbon containing at least one of nitrogen, phosphorus, oxygen and sulfur on the surface with a carbon fiber on the surface of which a graphite C plane is exposed or another carbon fiber on the surface of which the edge of the graphite C plane is exposed.

Patent Literature 1: Japanese Patent Application Laid-Open (JP-A) No. 2019-172476
Patent Literature 2: WO2017/135386
Patent Literature 3: JP-A No. 2007-061698

There is an attempt to use fuel cells as a power source for commercial vehicles such as buses and trucks. These commercial vehicles are required to operate over long distances, and in long-term operation, the carbon support in the catalyst layer of the fuel cells is oxidized and deteriorated, thereby decreasing the power performance of the fuel cells. Although it is effective to use a carbonaceous material having high crystallinity as a measure against oxidative deterioration of the carbon support, the particles of high crystalline carbon hardly forms a higher order structure, and the specific surface area of the high crystalline carbon is small. When the catalyst layer is formed of carbon having a small specific surface area, the particles of the carbon tend to be closely aggregated, and the carbon hardly forms a higher order structure. Accordingly, the catalyst layer is densified; gas does not sufficiently spread over the entire catalyst layer; and the initial power generation performance of the fuel cells decreases.

To prevent excessive densification, it is conceivable to add a conductive additive having an aspect ratio equal to or higher than a predetermined aspect ratio to the catalyst layer. When the aspect ratio is too small and when the amount of the conductive additive added is too small, the effect of suppressing densification is not obtained.

The conductive carbon fibers of Patent Literature 1 support metallic particles as a catalyst. The surface of the carbon supporting the metal particles is hydrophilized. In addition to the hydrophilic properties of the metal itself, since a catalytic process usually involves an acid treatment process, the carbon surface becomes hydrophilic without exception. When a catalyst layer is formed of such hydrophilic carbon, the gas diffusivity of the catalyst layer is decreased by a reduction in the drainage properties of the catalyst layer, and the power generation performance of the fuel cell is decreased.

SUMMARY

In light of the above circumstances, an object of the disclosed embodiments is to provide a catalyst layer that is low in gas diffusion resistance and proton resistance even when a support having a small specific surface area is used.

The catalyst layer of the disclosed embodiments is a catalyst layer for fuel cells, wherein the catalyst layer comprises a catalyst metal, a support and a conductive additive;

wherein the support supports the catalyst metal;

wherein a specific surface area of the support is 600 $m^2$/g-C or less;

wherein the conductive additive does not support the catalyst metal and has a larger aspect ratio than the support;

wherein the aspect ratio of the conductive additive is more than 10;

wherein, when a total mass of the catalyst layer is 100 mass %, a percent of the conductive additive contained in the catalyst layer is more than 2 mass % and less than 20 mass %; and wherein the conductive additive is a non-hydrophilized conductive additive.

The aspect ratio of the conductive additive may be 18 or more and 40 or less.

When the total mass of the catalyst layer is 100 mass %, the percent of the conductive additive contained in the catalyst layer may be 7 mass % or more and 15 mass % or less.

The support and the conductive additive may be carbonaceous materials.

According to the catalyst layer of the disclosed embodiments, even when the support having a small specific surface area is used, it is possible to reduce the gas diffusion resistance and to suppress an increase in proton resistance.

DETAILED DESCRIPTION

The catalyst layer of the disclosed embodiments is a catalyst layer for fuel cells, wherein the catalyst layer comprises a catalyst metal, a support and a conductive additive; wherein the support supports the catalyst metal; wherein a specific surface area of the support is 600 $m^2/g$-C or less; wherein the conductive additive does not support the catalyst metal and has a larger aspect ratio than the support; wherein the aspect ratio of the conductive additive is more than 10; wherein, when a total mass of the catalyst layer is 100 mass %, a percent of the conductive additive contained in the catalyst layer is more than 2 mass % and less than 20 mass %; and wherein the conductive additive is a non-hydrophilized conductive additive.

In the disclosed embodiments, the conductive additive which has the high aspect ratio and on which the catalyst metal is not supported, is mixed with the support which has the small specific surface area and on which the catalyst metal is supported, thereby forming the catalyst layer.

According to the disclosed embodiments, the gas diffusion resistance can be reduced by a void forming effect and a hydrophobic effect. Also, an increase in proton resistance can be suppressed by setting the amount of the conductive additive within a predetermined range. As a result, by using the catalyst layer of the disclosed embodiments in a fuel cell for commercial vehicles operated for a long time, the initial power generation performance of the fuel cell can be increased, and the durability performance of the fuel cell can be increased.

The catalyst layer of the disclosed embodiments contains the catalyst metal, the support and the conductive additive. As needed, the catalyst layer may contain a proton-conductive electrolyte, etc.

The catalyst metal is supported on the support; however, it is not supported on the conductive additive.

As the catalyst metal, for example, platinum (Pt) or an alloy of Pt and other metal (e.g., a Pt alloy mixed with cobalt, nickel or the like) may be used.

The electrolyte may be a fluorine-based resin or the like. As the fluorine-based resin, for example, a Nafion solution or the like may be used.

The support may be a carbonaceous material. For example, the carbonaceous material may be at least one selected from the group consisting of carbon black such as acetylene black and furnace black, vapor-grown carbon fibers (VGCF), carbon nanotubes and carbon nanofibers. The support may be carbon black. As the carbonaceous material, for example, a hydrophobized carbon material such that its hydrophobicity increased by heat treatment, may be used.

The support supports the catalyst metal.

The specific surface area (SSA) of the support may be 600 $m^2/g$-C or less, or it may be 580 $m^2/g$-C or less. The specific surface area of the support may be 150 $m^2/g$-C or more. When the specific surface area of the support is 600 $m^2/g$-C or less, degradation of the support due to oxidation, can be suppressed. When the specific surface area of the support is 150 $m^2/g$-C or more, the catalyst can be easily supported. It is considered that the same effects can be obtained when the specific surface area of the support is within a measurement error of 5%.

The support has a smaller aspect ratio than the conductive additive.

The form of the support is not particularly limited, as long as the condition of the aspect ratio is satisfied. As the form of the support, examples include, but are not limited to, a particulate (sphere) form, a scaly form, a fibrous form and an indefinite form.

The conductive additive may be a ceramic oxide, a carbonaceous material, a metal material or the like. From the viewpoint of reducing the gas diffusion resistance, the conductive additive may be a carbonaceous material. As the ceramic oxide, examples include, but are not limited to, titanium oxide. The carbonaceous material may be at least one selected from the group consisting of carbon black such as acetylene black and furnace black, vapor-grown carbon fibers (VGCF), carbon nanotubes and carbon nanofibers, for example. Among them, the carbonaceous material may be at least one selected from the group consisting of VGCF, carbon nanotubes and carbon nanofibers, from the viewpoint of electronic conductivity. As the metal material, examples include, but are not limited to, Ni, Cu, Fe and SUS.

The conductive additive does not support the catalyst metal.

The conductive additive has a larger aspect ratio than the support.

The aspect ratio (As) of the conductive additive may be more than 10, from the viewpoint of suppressing the gas diffusion resistance. The aspect ratio of the conductive additive may be 18 or more and 40 or less.

The form of the conductive additive is not particularly limited, as long as it satisfies the above-mentioned aspect ratio condition. As the form of the conductive additive, examples include, but are not limited to, a particulate form, a scaly form, a fibrous form and an indefinite form. The conductive additive may be in a scaly or fibrous form.

As the conductive additive, a non-hydrophilized conductive additive is used. That is, the conductive additive has hydrophobicity. When the conductive additive is a carbonaceous material, a non-hydrophilized carbonaceous material has hydrophobicity. For example, the carbonaceous material may be a hydrophobized carbonaceous material such that its hydrophobicity is increased by heat treatment.

In the disclosed embodiments, the catalyst-supporting support is kneaded with the conductive additive to form the catalyst layer, and the catalyst metal is not supported and catalyzed on the conductive additive. If the catalyst metal is supported on the conductive additive, the surface of the conductive additive is hydrophilized by an acid treatment that is generally carried out during a catalysis step. Therefore, even if the catalyst layer is a catalyst layer having a desired void ratio, the drainage function of the catalyst layer is reduced, and the effect of decreasing the gas diffusion resistance is not obtained.

According to the disclosed embodiments, the void ratio of the catalyst layer is increased by introducing the conductive additive into the catalyst layer. Also, since the conductive additive has hydrophobicity, water can be efficiently drained from the catalyst layer. By these effects, the gas diffusivity of the catalyst layer can be increased.

When the total mass of the catalyst layer is 100 mass %, the percent of the conductive additive contained in the catalyst layer may be more than 2 mass % and less than 20 mass %, or it may be 7 mass % or more and 15 mass % or less.

When the percent of the conductive additive contained in the catalyst layer is more than 2 mass %, the effect of reducing the gas diffusion resistance starts to be exhibited. When the percent of the conductive additive contained in the catalyst layer is less than 20 mass %, an increase in proton resistance is suppressed.

The catalyst layer of the disclosed embodiments is a catalyst layer for fuel cells.

The fuel cells may be a fuel cell composed of only one unit fuel cell, or it may be a fuel cell stack composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly.

The membrane electrode assembly includes an anode-side gas diffusion layer, an anode catalyst layer, an electrolyte membrane, a cathode catalyst layer and a cathode-side gas diffusion layer in this order.

The cathode includes a cathode catalyst layer and a cathode-side gas diffusion layer.

The anode includes an anode catalyst layer and an anode-side gas diffusion layer.

The cathode catalyst layer and the anode catalyst layer are collectively referred to as "catalyst layer".

As the catalyst layer, the catalyst layer of the disclosed embodiments is used.

The catalyst layer of the disclosed embodiments may be used as the cathode catalyst layer, and it may be used as the anode catalyst layer. The catalyst layer of the disclosed embodiments may be used as at least the cathode catalyst layer. The catalyst layer of the disclosed embodiments may be used as both the cathode catalyst layer and the anode catalyst layer.

The cathode-side gas diffusion layer and the anode-side gas diffusion layer are collectively referred to as "gas diffusion layer".

The gas diffusion layer may be a gas-permeable, electroconductive member or the like.

As the electroconductive member, examples include, but are not limited to, a porous carbonaceous material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

As needed, each unit fuel cell may include two separators sandwiching the membrane electrode assembly. One of the two separators is an anode-side separator, and the other is a cathode-side separator. In the disclosed embodiments, the anode-side separator and the cathode-side separator are collectively referred to as "separator".

The separator may include supply and discharge holes for delivering the reaction gas and the refrigerant in the unit fuel cell stacking direction. As the refrigerant, for example, a mixed solution of ethylene glycol and water may be used to prevent freezing at low temperature. The reaction gas is fuel gas or oxidant gas. The fuel gas may be hydrogen or the like. The oxidant gas may be oxygen, air, dry air, or the like.

As the supply hole, examples include, but are not limited to, a fuel gas supply hole, an oxidant gas supply hole and a refrigerant supply hole.

As the discharge hole, examples include, but are not limited to, a fuel gas discharge hole, an oxidant gas discharge hole and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may have a reactant gas flow path on a surface in contact with the gas diffusion layer. Also, on the opposite surface to the surface in contact with the gas diffusion layer, the separator may have a refrigerant flow path for keeping the temperature of the fuel cell at a constant level.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. On the surface in contact with the anode-side gas diffusion layer, the anode-side separator may have a fuel gas flow path for delivering the fuel gas from the fuel gas supply hole to the fuel gas discharge hole. On the opposite surface to the surface in contact with the anode-side gas diffusion layer, the anode-side separator may have a refrigerant flow path for delivering the refrigerant from the refrigerant supply hole to the refrigerant discharge hole.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. On the surface in contact with the cathode-side gas diffusion layer, the cathode-side separator may have an oxidant gas flow path for delivering the oxidant gas from the oxidant gas supply hole to the oxidant gas discharge hole. On the opposite surface to the surface in contact with the cathode-side gas diffusion layer, the cathode-side separator may have a refrigerant flow path for delivering the refrigerant from the refrigerant supply hole to the refrigerant discharge hole.

The separator may be a gas-impermeable electroconductive member or the like. The electroconductive member may be, for example, dense carbon in which carbon is compressed to be gas-impermeable, or a press-molded metal (e.g., iron, aluminum, stainless steel, or the like) plate. The separator may have a collecting function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

EXAMPLES

Example 1

A support supporting a catalyst metal (a catalyst-supporting support) and a conductive additive were prepared.

A carbonaceous material having a specific surface area of 580 $m^2$/g-C was used as the support.

Platinum was used as the catalyst metal.

Carbon fibers having an aspect ratio of 18 were used as the conductive additive.

A catalyst layer was produced by kneading the catalyst-supporting support and the conductive additive.

The amount of the conductive additive contained in the catalyst layer was set to 10 mass %.

The void ratio of the catalyst layer was 30%. The gas diffusion resistance of the catalyst layer at a temperature of 60° C. and a relative humidity (RH) of 120% was measured.

The proton resistance of the catalyst layer at a temperature of 60° C. and a relative humidity of 30% was measured.

The results are shown in Table 1.

Example 2

The catalyst layer of Example 2 was produced in the same manner as in Example 1, except that carbon fibers having an aspect ratio of 40 were used as the conductive additive. The void ratio, gas diffusion resistance and proton resistance of the catalytic layer were measured.

The results are shown in Table 1.

Example 3

The catalyst layer of Example 3 was produced in the same manner as in Example 1, except that the amount of the conductive additive contained in the catalyst layer was 7 mass %. The void ratio, gas diffusion resistance and proton resistance of the catalyst layer were measured.

The results are shown in Table 1.

Example 4

The catalyst layer of Example 4 was produced in the same manner as in Example 1, except that the amount of the conductive additive contained in the catalyst layer was 15 mass %. The void ratio, gas diffusion resistance and proton resistance of the catalyst layer were measured.

The results are shown in Table 1.

Comparative Example 1

The catalyst layer of Comparative Example 1 was produced in the same manner as in Example 1, except that carbon particles having an aspect ratio of 1 were used as the conductive additive. The void ratio, gas diffusion resistance and proton resistance of the catalyst layer were measured.

The results are shown in Table 1.

Comparative Example 2

The catalyst layer of Comparative Example 2 was produced in the same manner as in Example 1, except that carbon fibers having an aspect ratio of 10 were used as the conductive additive. The void ratio, gas diffusion resistance and proton resistance of the catalyst layer were measured.

The results are shown in Table 1.

Comparative Example 3

The catalyst layer of Comparative Example 3 was produced in the same manner as in Example 1, except that any conductive additive was not used. The void ratio, gas diffusion resistance and proton resistance of the catalytic layer were measured.

The results are shown in Table 1.

Comparative Example 4

The catalyst layer of Comparative Example 4 was produced in the same manner as in Example 1, except that the amount of the conductive additive contained in the catalyst layer was 2 mass %. The void ratio, gas diffusion resistance and proton resistance of the catalytic layer were measured.

The results are shown in Table 1.

Comparative Example 5

The catalyst layer of Comparative Example 5 was produced in the same manner as in Example 1, except that the amount of the conductive additive contained in the catalyst layer was 20 mass %. The void ratio, gas diffusion resistance and proton resistance of the catalytic layer were measured.

The results are shown in Table 1.

Comparative Example 6

The catalyst layer of Comparative Example 6 was produced in the same manner as in Example 1, except that the content of the conductive additive in the catalyst layer was 30 mass %. The void ratio, gas diffusion resistance and proton resistance of the catalytic layer were measured.

The results are shown in Table 1.

Comparative Example 7

The catalyst layer of Comparative Example 7 was prepared in the same manner as in Example 1, except that a conductive additive hydrophilized by acid treatment, was used. The void ratio, gas diffusion resistance and proton resistance of the catalytic layer were measured.

The results are shown in Table 1.

Comparative Example 8

The catalyst layer of Comparative Example 8 was produced in the same manner as in Example 1, except that a carbonaceous material having a specific surface area of 1200 $m^2$/g-C was used as the support, and any conductive additive was not used. The void ratio, gas diffusion resistance and proton resistance of the catalytic layer were measured.

The results are shown in Table 1.

Comparative Example 9

The catalyst layer of Comparative Example 9 was produced in the same manner as in Example 1, except that a carbonaceous material having a specific surface area of 1200 $m^2$/g-C was used as the support, and the amount of the conductive additive contained in the catalyst layer was 10 wt. %. The void ratio, gas diffusion resistance and proton resistance of the catalytic layer were measured.

The results are shown in Table 1.

TABLE 1 1

| | Support SSA ($m^2$/g-C) | Conductive additive As (-) | Content (wt. %) | Acid-treated or not | Catalyst layer Void ratio (%) | Gas diffusion resistance [s/m] 60° C. 120% RH | Proton resistance (Ω $cm^2$) 60° C. 30% RH |
|---|---|---|---|---|---|---|---|
| Comparative Example 1 | 580 | 1 | 10 | No | 25 | 150 | 0.96 |
| Comparative Example 2 | | 10 | 10 | No | 24 | 148 | 0.98 |
| Example 1 | | 18 | 10 | No | 30 | 132 | 0.95 |
| Example 2 | | 40 | 10 | No | 42 | 85 | 0.95 |
| Comparative Example 3 | | — | 0 | No | 24 | 149 | 0.97 |
| Comparative Example 4 | | 18 | 2 | No | 25 | 148 | 0.95 |
| Example 3 | | 18 | 7 | No | 29 | 130 | 1.00 |
| Example 4 | | 18 | 15 | No | 34 | 100 | 1.00 |

TABLE 1 1-continued

|  | Conductive additive | | | | Catalyst layer | | |
| --- | --- | --- | --- | --- | --- | --- | --- |
|  | Support SSA (m²/g-C) | As (—) | Content (wt. %) | Acid-treated or not | Void ratio (%) | Gas diffusion resistance [s/m] 60° C. 120% RH | Proton resistance (Ω cm²) 60° C. 30% RH |
| Comparative Example 5 |  | 18 | 20 | No | 38 | 98 | 1.2 |
| Comparative Example 6 |  | 18 | 30 | No | 45 | 104 | 1.35 |
| Comparative Example 7 |  | 18 | 10 | Acid-treated | 30 | 142 | 0.95 |
| Comparative Example 8 | 1200 | — | 0 | No | 43 | 95 | 0.95 |
| Comparative Example 9 |  | 18 | 10 | No | 45 | 93 | 1.1 |

In Comparative Example 7, the conductive additive was acid-treated to hydrophilize the surface thereof and used in the catalyst layer. For the catalyst layer, as with Example 1, an increase in void ratio was confirmed; however, the effect of suppressing the gas diffusion resistance was not large. The reason is considered as follows: because the introduced conductive additive was hydrophilic, the drainage function in the catalyst layer was not sufficient.

In the catalyst layer of Comparative Example 8 using the support having a specific surface area of more than 600 m²/g-C, since the catalyst layer had a developed high order structure, the gas diffusion resistance is low without introducing a conductive additive. It is revealed that the catalyst layer of Comparative Example 9 which was obtained by introducing the hydrophobic conductive additive into the catalyst layer of Comparative Example 8, does not obtain the effect of increasing the void ratio and the effect of reducing the gas diffusion resistance.

As a result of comparing the catalytic layers of Comparative Examples 1 and 2 and Examples 1 and 2, it is revealed that as the aspect ratio of the conductive additive increases, the void ratio increases and the gas diffusion resistance decreases. Also, it revealed that when the aspect ratio of the conductive additive is more than 10 and less than or equal to 40, an increase in proton resistance can be suppressed.

As a result of comparing the catalyst layers of Comparative Examples 3 to 6 and Examples 3 and 4, it is revealed that the void ratio increases as the amount of the conductive additive contained in the catalyst layer increases. It is revealed that when the amount of the conductive additive contained in the catalyst layer is 20 mass % or more, while the effect of reducing the gas diffusion resistance is obtained, the proton resistance increases. Therefore, it is revealed that when the content ratio of the conductive additive in the catalyst layer is more than 2 mass % and less than 20 mass %, the balance between the gas diffusion resistance and the proton resistance is excellent.

The invention claimed is:

1. A catalyst layer for fuel cells,
wherein the catalyst layer comprises a catalyst metal, a support and a conductive additive;
wherein the support supports the catalyst metal;
wherein a specific surface area of the support is 580 m²/g-C;
wherein the conductive additive does not support the catalyst metal and has a larger aspect ratio than the support;
wherein the aspect ratio of the conductive additive is 40;
wherein, when a total mass of the catalyst layer is 100 mass %, a percent of the conductive additive contained in the catalyst layer is 10 mass %; and
wherein the conductive additive is a non-hydrophilized conductive additive.

2. The catalyst layer according to claim 1, wherein the support and the conductive additive are carbonaceous materials.

* * * * *